March 3, 1970  H. DE SAINT-PIERRE ET AL  3,497,939
CONNECTOR STAKING MACHINE
Filed Dec. 27, 1967  11 Sheets-Sheet 2
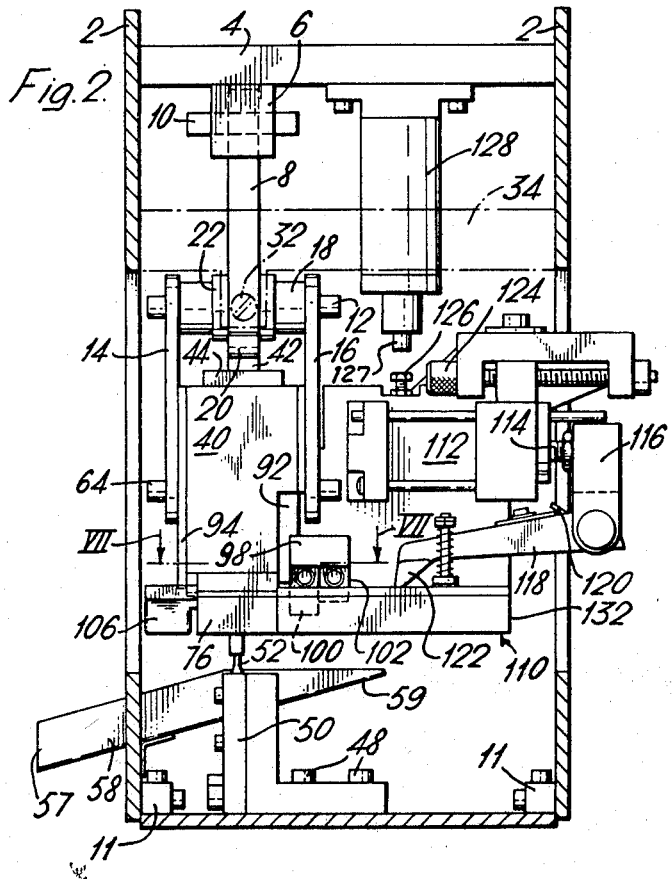
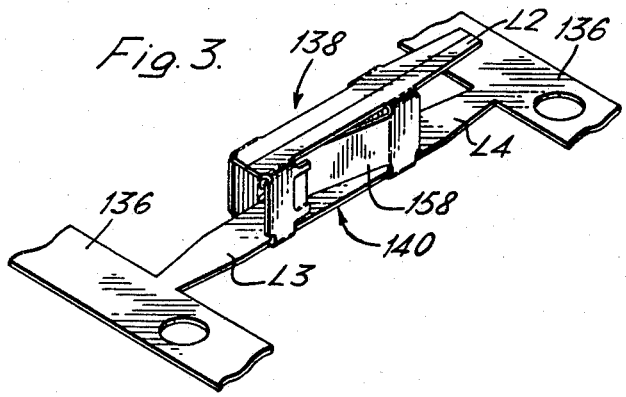
INVENTOR
HENRI de SAINT-PIERRE
JEAN BERNARD GUEROUT
JEAN CLAUDE JOLY
BY Adrian J. LaRue March 3, 1970  H. DE SAINT-PIERRE ET AL  3,497,939
CONNECTOR STAKING MACHINE
Filed Dec. 27, 1967  11 Sheets-Sheet 3

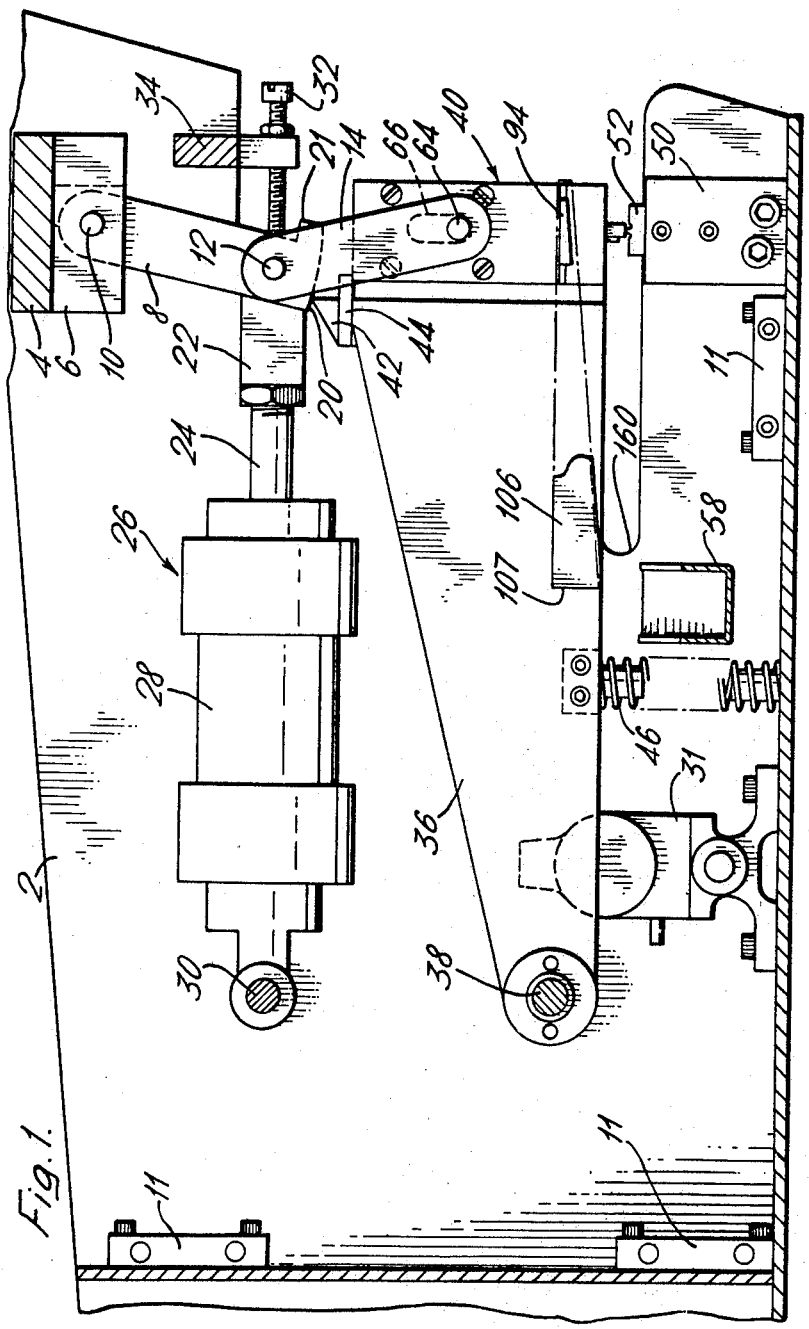

INVENTOR
HENRI de SAINT-PIERRE
JEAN BERNARD GUEROUT
JEAN CLAUDE JOLY
BY Adrian J. LaRue INVENTOR
HENRI de SAINT-PIERRE
JEAN BERNARD GUEROUT
JEAN CLAUDE JOLY BY Adrian J. La Rue

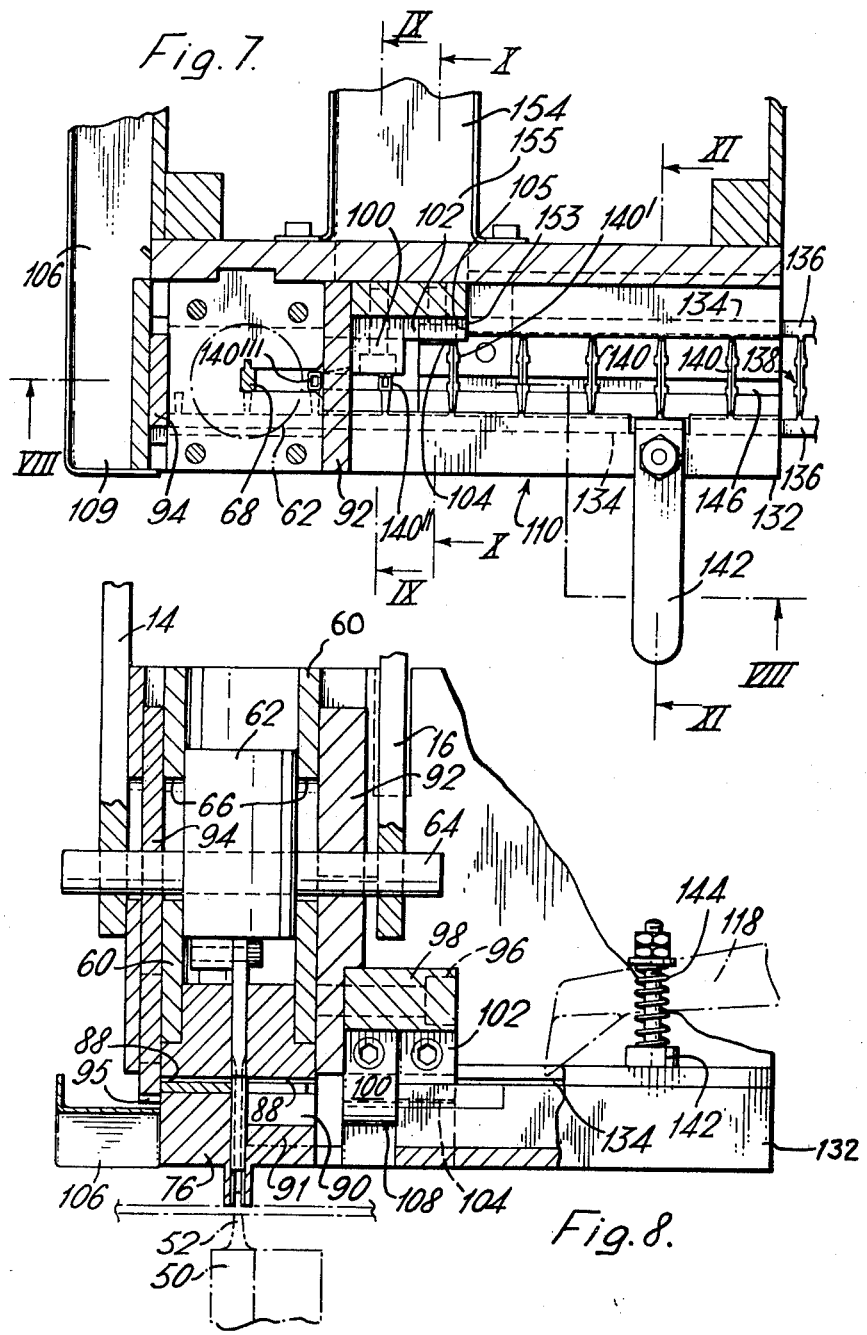

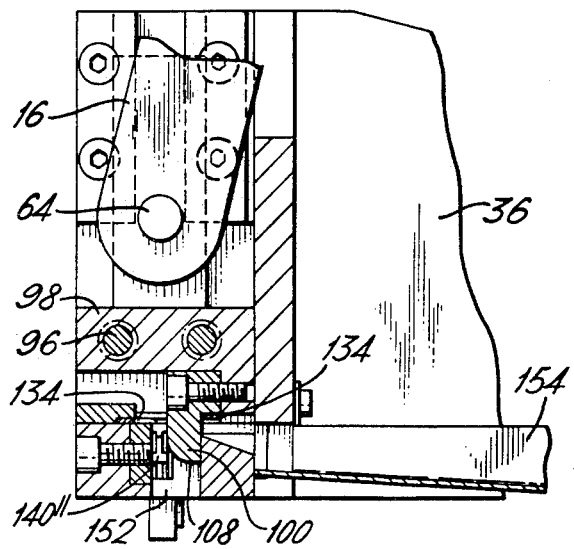
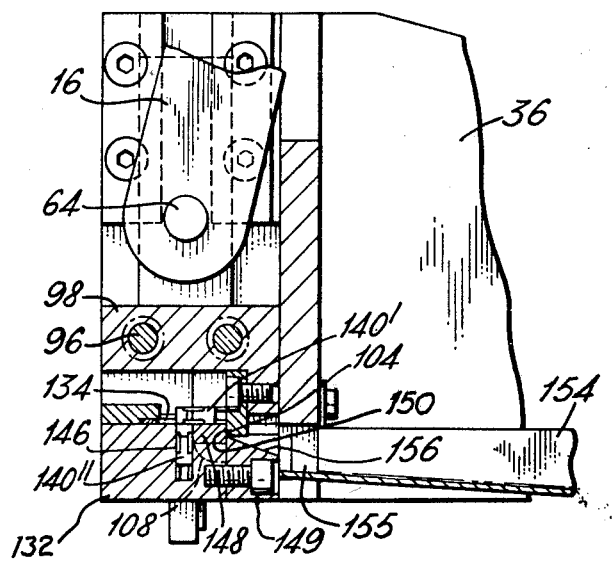

March 3, 1970  H. DE SAINT-PIERRE ET AL  3,497,939
CONNECTOR STAKING MACHINE
Filed Dec. 27, 1967  11 Sheets-Sheet 8
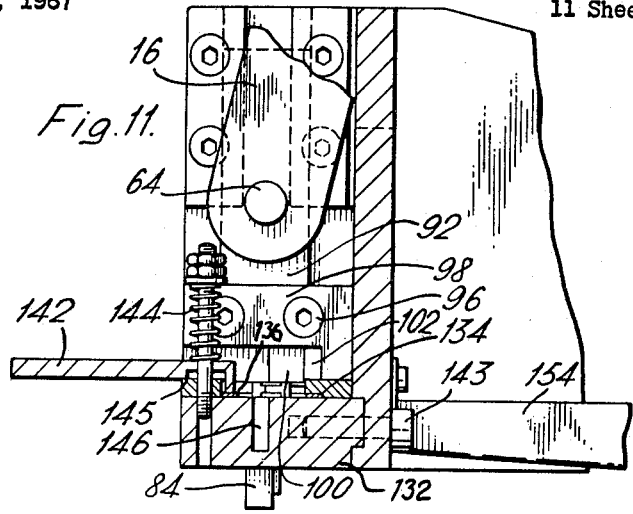
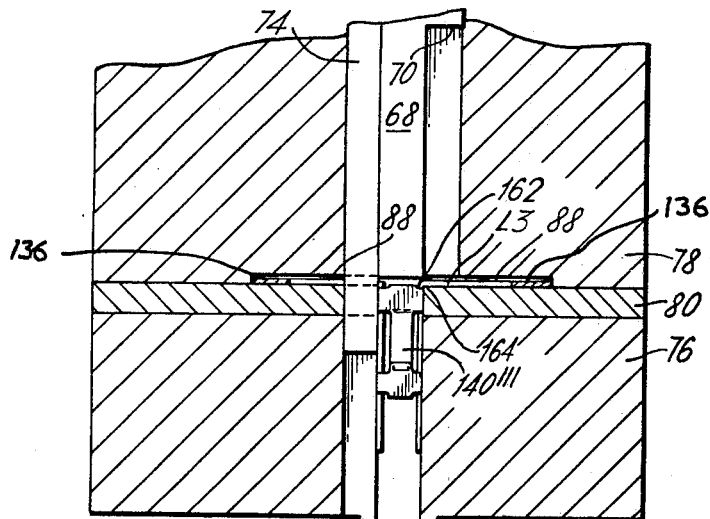
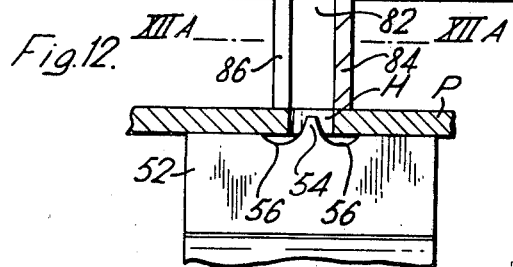
INVENTOR
HENRI de SAINT-PIERRE
JEAN BERNARD GUEROUT
JEAN CLAUDE JOLY
BY Adrian J. LaRue

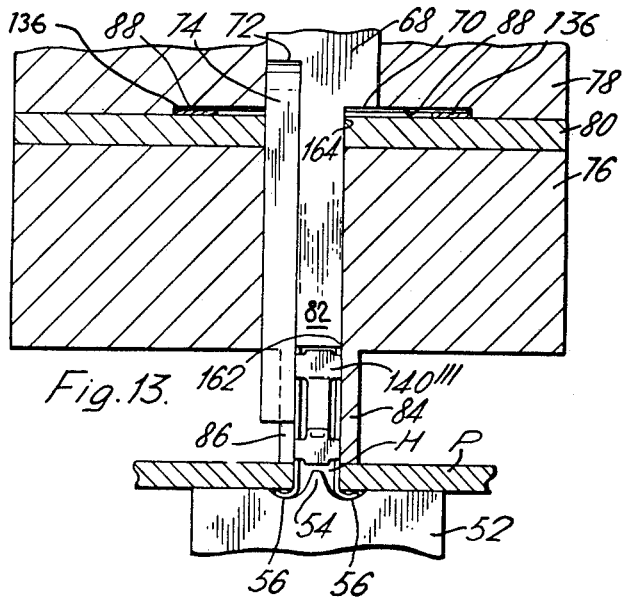
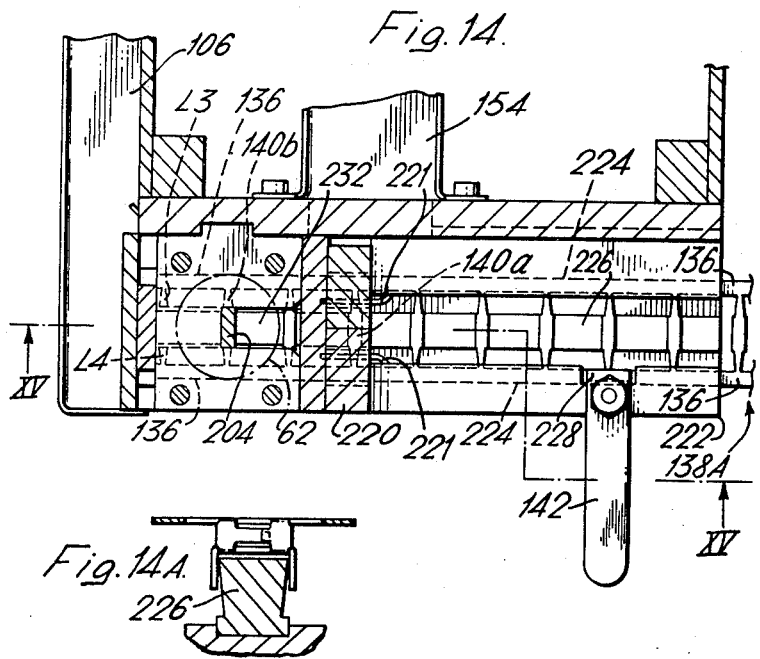

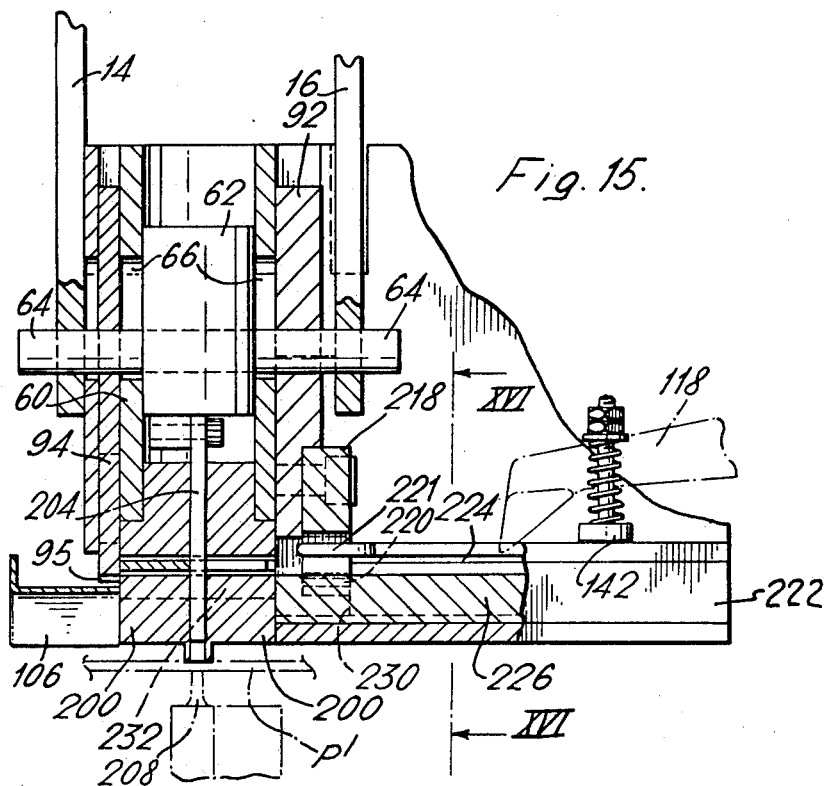
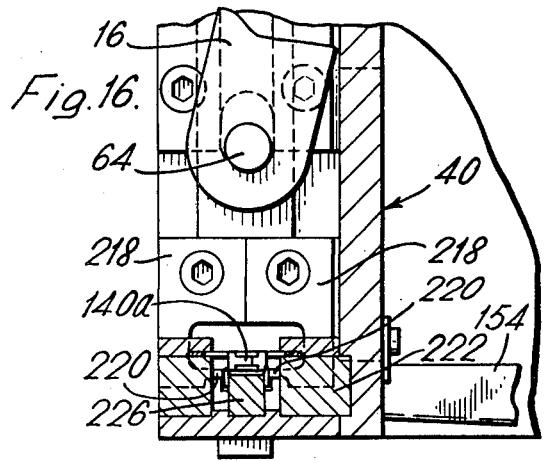

March 3, 1970  H. DE SAINT-PIERRE ET AL  3,497,939
CONNECTOR STAKING MACHINE
Filed Dec. 27, 1967  11 Sheets-Sheet 11
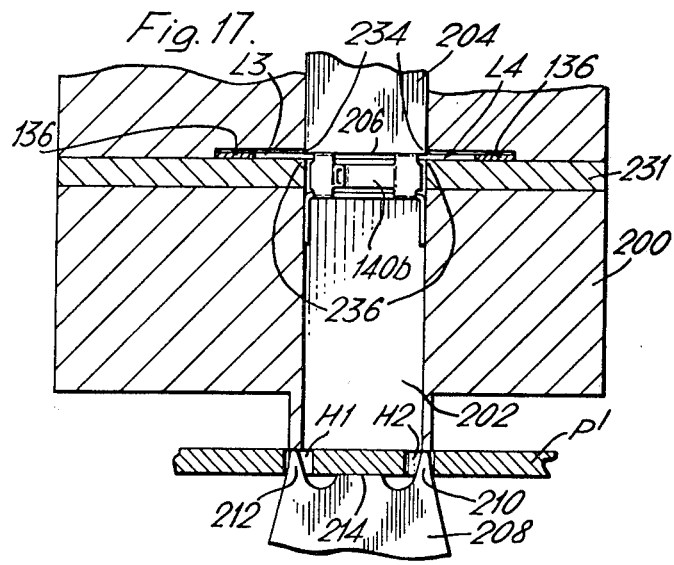
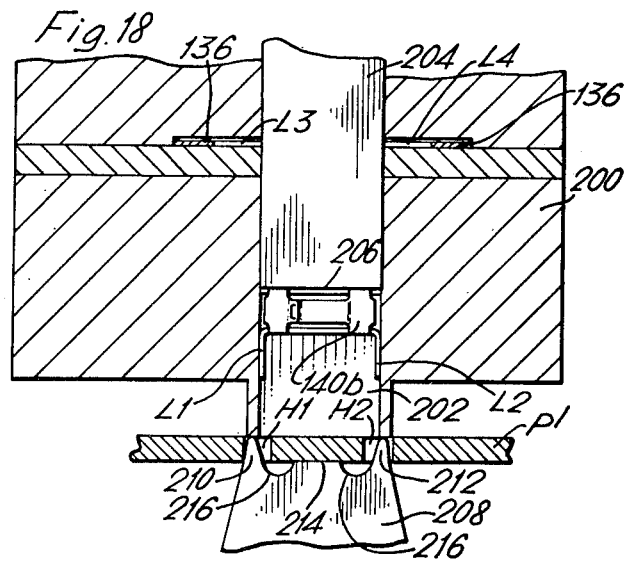
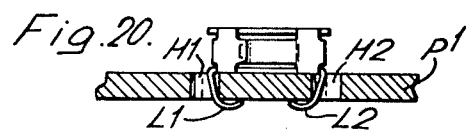
INVENTOR
HENRI de SAINT-PIERRE
JEAN BERNARD GUEROUT
JEAN CLAUDE JOLY
BY Adrian J. La Rue United States Patent Office 3,497,939
Patented Mar. 3, 1970

3,497,939
CONNECTOR STAKING MACHINE
Henri de Saint-Pierre, Paris, Jean Bernard Guerout, Conflans-Sainte-Honorine, and Jean Claude Joly, Paris, France, assignors to AMP Incorporated, Harrisburg, Pa.
Filed Dec. 27, 1967, Ser. No. 693,977
Claims priority, application France, Jan. 4, 1967, 89,966
Int. Cl. B21d 28/00
U.S. Cl. 29—203                     18 Claims

ABSTRACT OF THE DISCLOSURE

Connector staking machine shears connectors from a strip and stakes them in position on a printed circuit board. The machine, according to one mode of operation, stakes the connectors on the printed circuit board so that the insertion axes are in a vertical orientation relative to the printed circuit board, and according to another mode of operation, stakes the connectors on the printed circuit board so that the insertion axes are in a parallel disposition relative to the printed circuit board.

---

An electrical connector, for example an electrical receptacle, may have a pair of legs extending from one end of the connector and one or more legs extending from the other end of the connector. Such connectors may be joined together in strip form and may after being severed from the strip be mounted on a panel with two of the legs extending through and being secured to the panel.

The invention relates to apparatus for securing electrical connectors to a panel, the connectors being in the form of a strip of connectors, each connector having a pair of legs extending from one end of the connector and one or more legs extending from the other end of the connector. According to this invention the apparatus comprises a strip processing station at which the strip is acted upon so that two of the legs of a connector of the strip extend essentially at right angles to the strip, means for advancing the strip of connectors from the processing station towards a shearing station at which the connector is sheared from the strip, an anvil spaced from the shearing station, a tool arranged to drive the connector, when sheared from the strip, from the shearing station towards the anvil and surfaces for guiding the connector when so driven by the tool, so that the two legs are driven through a panel disposed between the shearing station and the anvil so that the two legs are deformed by the anvil to secure the connector to the panel.

Such apparatus may readily be constructed so that the strip processing, shearing and driving operations are performed in a given sequence by the activation of a single motor, e.g. a pneumatic piston-and-cylinder motor. The apparatus may also readily be constructed with interchangeable parts so that the legs of the pair, or if desired, one leg of the pair and another of the legs are deformed to secure the connector to the panel.

An object of the invention is to provide a staking machine for staking electrical connectors or the like onto a connector-carrying member with the insertion axes of the connectors being disposed in a vertical position relative to the connector-carrying member.

Another object of the invention is the provision of a staking machine for staking electrical connectors or the like onto a connector-carrying member with the insertion axes of the connectors being disposed in a parallel position relative to the connector-carrying member.

A further object of the invention is to provide a staking machine having interchangeable parts for staking connectors in vertical or horizontal positions on a connector-mounting member.

An additional object is the provision of a staking machine having means for driving a connector severed from a strip of connectors into secured engagement with a connector-mounting member which means also holds the connector-mounting member in position to receive the connector prior to the connector being secured thereon.

Other objects and attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive nor limiting of the invention but are given for purposes of illustration in order that others skilled in the art may fully understand the invention and the principles thereof and the manner of applying it in practical use so that they may modify it in various forms, each as may be best suited to the conditions of a particular use.

For a better understanding of the invention, reference will now be made solely by way of example, to the accompanying drawings, in which:

FIGURE 1 is a side view in section, with the casing removed, of apparatus for attaching electrical connectors to an insulating panel, the apparatus being assembled for a first mode of operation;

FIGURE 2 is an end view of the apparatus, taken in section, through the frame of the apparatus;

FIGURE 3 is an enlarged perspective view of part of a strip of electrical connectors for the first mode of operation;

FIGURE 7 is an enlarged sectional view taken on the lines 7—7 of FIGURE 2;

FIGURE 8 is a sectional view taken on the lines 8—8 of FIGURE 7;

FIGURE 9 is a sectional view taken on the lines 9—9 of FIGURE 7;

FIGURE 10 is a sectional view taken on the lines 10—10 of FIGURE 7;

FIGURE 11 is a sectional view taken on the lines 11—11 of FIGURE 7;

FIGURES 12 and 13 are enlarged fragmentary sectional views illustrating the operation of the apparatus, according to the first mode;

FIGURE 12A is a sectional view taken on the lines 12A—12A of FIGURE 12;

FIGURE 14 is a similar view to that of FIGURE 7, but illustrating the apparatus assembled for a second mode of operation;

FIGURE 14A is a cross-sectional view of a detail of FIGURE 14;

FIGURE 15 is a sectional view taken on the lines 15—15 of FIGURE 14;

FIGURE 16 is a sectional view taken on the lines 16—16 of FIGURE 15;

FIGURES 17 and 18 are enlarged fragmentary sectional views illustrating the operation of the apparatus, according to the second mode;

FIGURE 20 is an enlarged fragmentary sectional view through a panel showing an electrical connector attached thereto according to the second mode.

Figure 4:
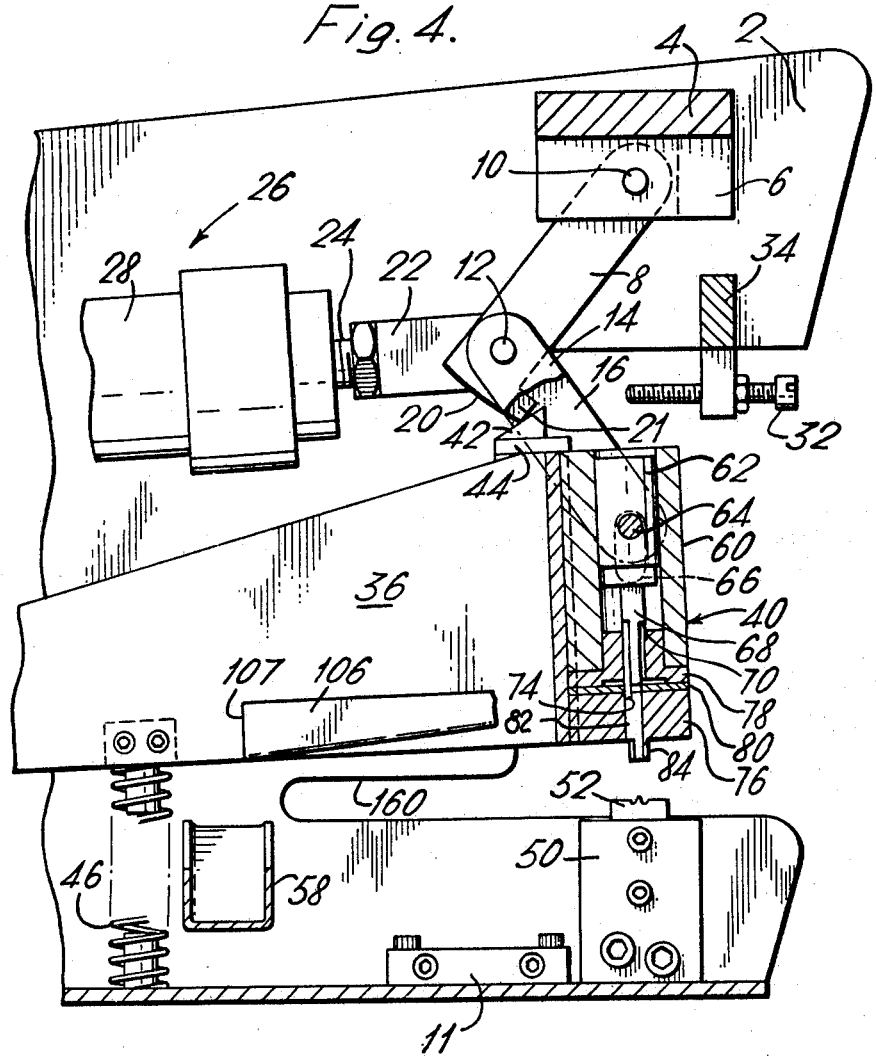
FIGURES 4, 5 and 6 are fragmentary, partly sectional views illustrating parts of the apparatus in three respective positions of operation.

Reference will now be made to FIGURES 1 to 13. The apparatus comprises a sheet metal frame 2 of essentially U-shaped cross-section (as seen in FIGURE 2), the parts of the frame being secured together by screw blocks 11. A tie bar 4 extending between the arms of the frame 2 supports a clevis 6 in which is mounted a toggle link 8 to pivot at one end about a pin 10. The other end of the link 8 is pivotally connected by a pin 12 to further toggle links 14 and 16 maintained in parallel spaced relationship by a spacer shaft 18 (FIGURE 2), the link 8 being formed with an arcuate cam surface 20 and a cam projection 21. Also pivotally mounted on the pin 12 is a clevis 22 on a piston rod 24 of a pneumatic piston-and-cylinder motor 26, the cylinder 28 of which is pivotally mounted on a pin 30 (FIGURE 1) supported between the arms of the frame 2. The motor 26 is controlled by a solenoid valve 31 (FIGURE 1). An adjustable stop screw 32 is threaded in an extension of a further tie bar 34 carried between the arms of the frame 2.

A tool head carrier 36 is pivotally mounted at one end on a pin 38 (FIGURE 1) carried between the arms of the frame 2 and has fixed to its other end a tool head 40 and a triangular-section cam follower 42 on a support 44, the carrier 36 being urged in an anticlockwise (as seen in FIGURE 1) sense of rotation about the pin 38 by a spring 46. Releasably secured to the base of the frame 2 by bolts 48 is an anvil assembly 50 for the first mode of operation, the assembly 50 supporting an anvil 52 which, as best seen in FIGURES 12 and 13, has a horn 54 on either side of which are concave forming surfaces 56. A first inclined waste chute 58 has an outlet end 57 projecting from the frame 2 and an inlet end 59 within the frame 2, as shown in FIGURE 2.

The tool head 40 comprises a cylinder 60 slidably receiving a plunger 62 connected pivotally to the links 14 and 16 by a pin 64 extending through slots 66 in the wall of the cylinder 60. Releasably secured to the plunger 62 is a shearing and connector attachment tool 68 for the first mode of operation, the tool 68 having a guide shoulder 70 and a recess 72 (FIGURE 13) receiving a shear force reaction absorber rod 74. A tool guide block assembly releasably attached to the cylinder 60 at its end nearest the anvil 52 comprises blocks 76 and 78 between which is a shear plate 80, the block 76 and 78 and the plate 80 co-operating to define a tool-receiving channel 82 which extends through a projecting nose 84 of the block 76, the nose 84 having a slot 86 for receiving the rod 74, as best seen in FIGURES 12, 12A and 13. The plate 80 and the block 78 co-operate to define a transverse slot 88 extending on either side of the channel 82 and communicating with opposite faces of the blocks 76 and 78, as best seen in FIGURE 8. Also as best seen in FIGURE 8, the block 76 has a recess 90 communicating with the slot 88 and channel 82 and opening into the right-hand (as seen in FIGURE 8) face of the block 76. In the recess 90 is a connector stabilizer rib 91.

Figure 6:
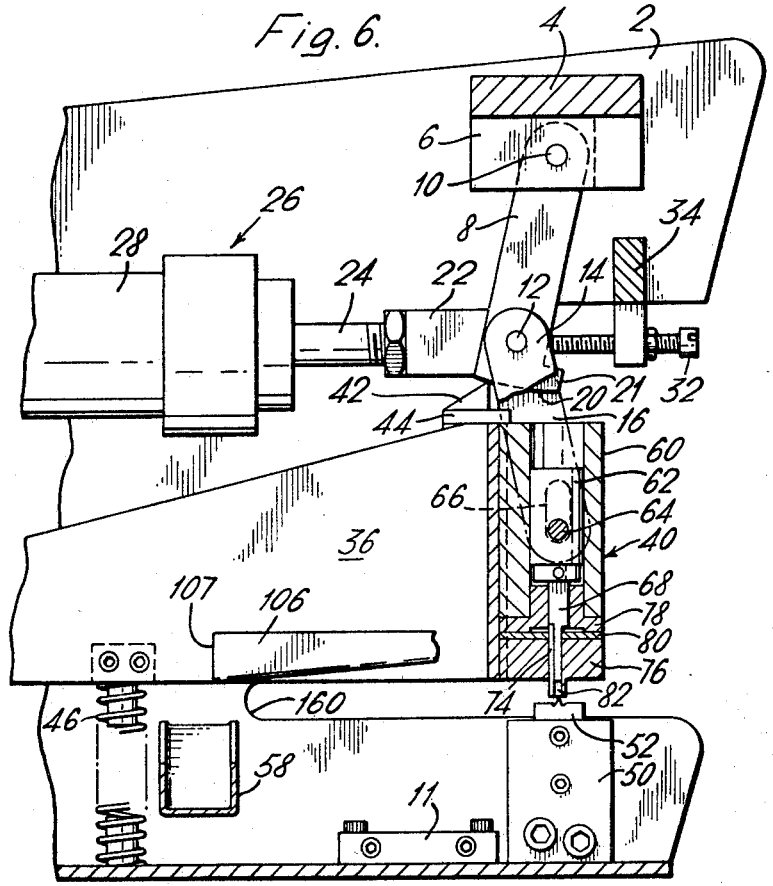

The pin 64 extends through a tool carrier plate 92 and a shear plate 94 having a shearing edge 95. As best seen in FIGURE 8, the plates 92 and 94 are slidably guided on either side of the cylinder 60 for movement with the pin 64. The plate 92 has detachably secured thereto by a bolt 96 a tool holder 98 carrying a strip-processing tool 100 and a shear tool 102 for the first mode of operation, the tool 102 having shear edges 104 and 105 (FIGURE 7). As best seen in FIGURE 9, the tool 100 has an arcuate connector bending surface 108. A second inclined waste chute 106 is secured to the left-hand (as seen in FIGURE 8) side of the block 76 and has an outlet end 107 disposed directly above (as seen in FIGURES 1 and 4 and 6) the chute 58, and an inlet end 109 (FIGURE 7) directly beneath (as shown in FIGURE 8) the edge 95.

A connector feed assembly generally referenced 110 is secured to the opposite side of the head 40 to the chute 106 and comprises a piston-and-cylinder motor 112 (FIGURE 2) having a piston rod 114 carrying a clevis 116 in which is pivotally mounted a connector feed finger 118 biased in an anticlockwise sense of rotation by a spring 120, the finger 118 having a working tip 122. The finger 118 is arranged to be driven in reciprocating motion by the motor 112, the rest position of the finger 118 being adjustable by a screw 124. On the cylinder 60 is a stop screw 126 for co-operation with the plunger 127 of a valve 128 (FIGURE 2) secured to the frame 2, this valve controlling the operation of the motor 112 and thus of the feed finger 118. The assembly 110 also comprises a connector feed block 132 having feed channels 134 (FIGURE 7, 8, 10 and 11) receiving carrier strips 136 of a strip 138 of electrical connectors 140 joined together in side-by-side or "ladder strip" form. The strip 138, which is described in detail below, is fed a connector length at a time by the feed finger 118 towards the head 40, as described below.

The block 132 is for the first mode of operation and is detachably secured to the assembly 110 by bolts 143 (FIGURE 11) only one of which is shown. As best seen in FIGURE 11, the strip 136 is held resiliently against the block 132 by a pressure pad 142 loaded by a spring 144 and being mounted to pivot about an edge 145. The block 132 has a through vertical channel 146 communicating with the recess and being of the same width. As shown in FIGURE 10, the block 132 has in a recess thereof a shear block 148 having a shear edge 150 for co-operation with the shear edge 104, the block 132 having a further recess 152 (as best seen in FIGURE 9) for receiving the bending tool 100. The block 132 also has a shear edge 153 for co-operation with the edge 105 (FIGURE 7). A third waste chute 154 extending in the same direction as the chute 106 has an inlet end 155 in alignment with an inclined surface 156 of a waste discharge block 149 (FIGURE 10) bolted to the block 132. The other, i.e. the outlet, end (not shown), of the chute 154 lies directly above the chute 58.

The strip 138 of connectors 140 will now be described in detail with reference to FIGURE 3. The connectors 140 (only one of which is shown in FIGURE 3) which are receptacles for electrical posts (not shown) are identical. Each connector comprises a pair of contact springs 158 for gripping an electrical post when inserted into the connector. A leg L3 extends from one end of the connector, a pair of parallel legs L2 and L4 extending from the other end thereof. The legs L3 and L4 are formed integrally with the carrier strips 136 and the leg L2 being free ended.

Prior to an operating cycle of the apparatus, the parts thereof are positioned as shown in FIGURE 4, the tool head carrier 36 being in its fully anticlockwise (as seen in FIGURE 4) position and the piston rod 24 being fully retracted.

In this position of the parts, the lower (as seen in FIGURE 8) end of the plate 94 lies above the slot 88 and the plate 92 is positioned relative to cylinder 60 so that the tools 100 and 102 lie above (as seen in FIGURE 8) the block 132.

The strip 138 is positioned as shown in FIGURES 7 and 11, with the carrier strips 136 in the channels 134. An insulating panel P having, as shown in FIGURES 12 and 13, a hole H is inserted into guide slots 160 of the frame 2 as shown in FIGURES 1 and 4-6 and is oriented so that the horn 54 of the anvil 52 extends through the hole H.

Figure 5:
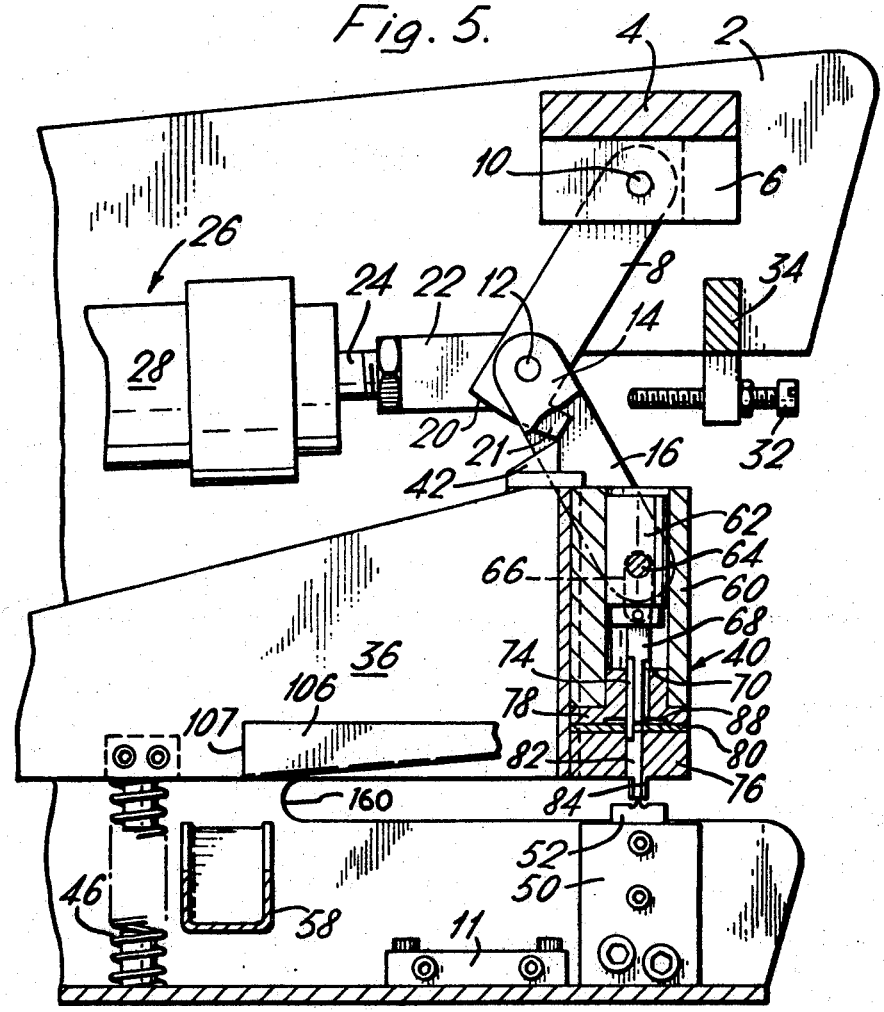

A pedal (not shown) is now actuated to cause the motor 26 to advance its piston rod 24 so that links 8, and 14 and 16 spread apart and the projection 21 slides along the surface of the cam follower 42 so that the carrier 36 is driven in clockwise (as seen in FIGURES 4 and 5) rotation about the pin 38 against the action of the spring 46, whereby the nose 84 engages the panel P, as shown in FIGURE 12. The parts are now positioned as shown in FIGURE 5, the panel P being held firmly between the nose 84 and the anvil 52 as illustrated in FIGURE 12. During the advance of the piston rod 24, the piston rod 114 is advanced to retract the feed finger 118, the tip 122 of which is cammed over one of the connectors of the strip 138 against the action of the spring 120.

As the piston rod 24 continues its advance, the links 8, and 14 and 16 are further spread apart so that the surface 20 rides over the follower 42, until the link 8 engages the stop screw 32 whereupon the piston rod 24 is stopped so that the parts are positioned as shown in FIGURES 1 and 6. Since the carrier 36 was stopped in the position of FIGURE 5, the plunger 62 and the plates 92 and 94 slide relative to the cylinder 60 towards the base of the frame 2, as the links 8 and 14 and 16 move from their positions of FIGURE 5 to their positions of FIGURE 6. During this movement of the plates, the shear edge 104 of the tool 102 co-operates, as shown in FIGURE 10, with the shear edge 150 of the block 148 to shear the leg L4 of the connector opposite these edges (this connector being referenced 140' in FIGURES 7 and 10), from the strip 136 to which that leg is attached. The edges 105 and 153 co-operate to shear the carrier strip so that the end thereof is severed and slides down the surface 156 into the chute 154 and thence into the chute 58 and out of the apparatus.

The surfaces 108 and the tool 100 engage the connector 140" next ahead of the connector 140' and bend it down at right angles to the carrier strip 136, as shown in FIGURE 9.

As the parts move from the position of FIGURE 5 to the position of FIGURE 6, which correspond respectively to the positions of FIGURES 12 and 13, the tool 68 and rod 74 move down the channel 82. A shear edge 162 of the tool 68 co-operates with a shear edge 164 of the plate 80 to shear from the leading connector 140''' (previously bent down by the tool 100) of the strip, its leg L3. The connector 140''' is then pushed down the channel 82 by the tool 68, the rod 74 riding in the slot 86 so that the legs L2 and L4 of the connector 140''' are pushed through the hole H in the panel P and are bent by the surfaces 56 back against the lower (as seen in FIGURE 13) surface of the panel P whereby the connector 140''' is secured to the panel P in a perpendicular or vertically extending position, as shown in FIGURE 13, the movement of tool 68 being limited by the engagement of the link 8 with the stop screw 32.

The end of the remaining carrier strip, which protrudes from the slot 88 is severed by the edge 95 of the plates 94 and falls into the chute 106 and thence into the chute 58.

The carrier 36 is returned to the position of FIGURE 4 under the action of the spring 46, the piston 28 then being returned to the position of FIGURE 4 as a result of the link 8 engaging a microswitch (not shown) when resting against the stop screw 32, so that the solenoid valve 31 is actuated.

During the return movement of the carrier 36, the piston rod 114 is retracted by the motor 112 when the screw 126 engages the plunger 127, so that the strip 138 of connectors is advanced by the distance between the longitudinal axes of two adjacent connectors of the strip.

During its advance through the recess 90, the legs L2 and L4 of each connector straddle the rib 91 so that the connector is guided and stabilized.

The second mode of operation of the apparatus will now be described with reference to FIGURES 14 to 20. With this mode of operation, a strip 138A (FIGURE 19) of connectors is employed, this strip being identical with the strip 138 excepting that each connector has a further leg, L1, at the opposite end of the connector to the legs L2 and L4. The parts of the strip are otherwise referenced in the same way in FIGURE 19 as in FIGURE 3. According to this mode of operation each connector of the strip 138A is attached to an insulating panel P' (FIGURE 20) with the legs L1 and L2, i.e. the free ended legs extending through holes H1 and H2 in the panel P'.

For assembling the apparatus for operation according to the second mode, the tool guide block assembly 76, 78, 80 is replaced by a further such assembly comprising a block 200 (FIGURES 17 and 18) which is similar to the block 76, but which has a channel 202 capable of accommodating the connector when oriented as shown in FIGURES 17 and 18, and a shear plate 231 having shear edges 236. The tool 68 is replaced by a tool 204 similar to the tool 68, but having a working face 206 substantially of the same width as the channel 202, the anvil 52 being replaced by an anvil 208 having two horns 210 and 212 arranged to extend through the holes H1 and H2 respectively, the anvil having a flat face 214 on either side of which are concave forming surfaces 216. The tool holder 98 is replaced by strip processing tools 218 having oppositely directed connector bending fingers 220 (FIGURES 14 and 16). The block 132 is replaced by a connector feed block 222 (FIGURES 14 and 15) having connector strip guiding channels 224 in which carrier strips 136 are received with the connectors 140 lying below the channels 224. The block 222 has a central longitudinally extended channel in which is a connector support bar 226 (best seen in FIGURE 16) of trapezoidal cross-section (FIGURE 14A) extending the full length of the channel, the greatest width of the bar 226 corresponds to the distance between the roots of the legs L1 and L2, as shown in FIGURE 14A. The block 222 has a spring loaded pressure pad 228, identical with the pad 142, engaging one of the strips 136. A recess 230 in the block 222 receives the tools 218, which are so arranged that the fingers 220 pass between the legs of the connectors when the plate 92 is in its raised position relative to the cylinder 60. The block 222 has projecting hold-down fingers 221 which engage the top of the strip 138A. In the block 200 is a connector supporting rib 232 in line with the bar 226.

The strip 138A is advanced by the feed finger 118, as described above with reference to the first mode of operation.

Figure 19:
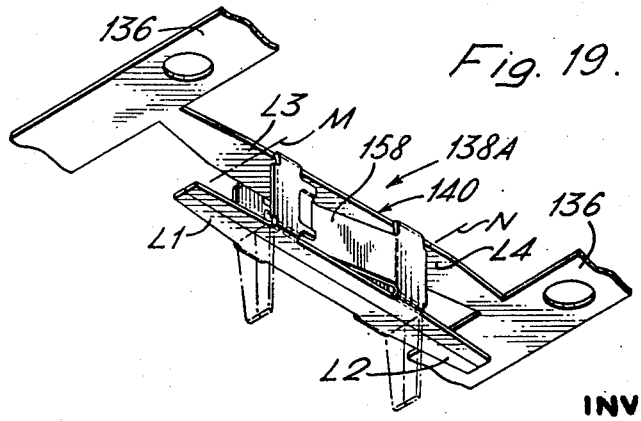
FIGURE 19 is an enlarged perspective view of part of a strip of electrical connectors for the second mode of operation.

In operation, the panel P' is placed with the aid of the slot 160 so that the horns 210 and 212 of the anvil 208 extend through the holes H1 and H2 respectively and the panel P' rests on the flat surface 214 of the anvil. The pedal (not shown) is then actuated so that the piston rod 24 is advanced as described above so that the panel P' is trapped between the block 200 and the surface 214. As the plate 92 slides relative to the cylinder 60, the fingers 220 of the tools 218 engage the legs L1 and L2 of the connector references 140a in FIGURES 14 and 16 and bend these legs against the inclined sides of the bar 226 so that the legs L1 and L2 are permanently deformed to extend perpendicularly to the strip 136, as indicated in broken lines in FIGURE 14. The tool 206 engages the connector references 140b in FIGURES 14, 17, and 18, the edges 234 of the surface 206 co-operating with the edges 236 of the plate 231 to shear off the legs L3 and L4 of the connector 140b along lines M and N, as indicated in FIGURES 17–19, the tool 204 thereafter pushing the connector 140b down the channel 202 so that the legs L1 and L2 of the connector 140b are pushed through the holes H1 and H2 respectively, of the panel P', these legs being bent by the inner surfaces of the horns 210 and 212 and the forming surfaces 216 to assume the position in which the legs L1 and L2 are shown in FIGURE 20. The strips 136 and legs L3 and L4 which have been severed during the next but one previous severing operation and which extend from between the blocks 199 and 200 are severed by the plate 94, the severed positions falling into the chute 106, and thence into the chute 54. The anvil may otherwise be formed with the arcuate leg-bending surfaces disposed outwardly of the horns, so that the legs L1 and L2 are bent away from instead of towards one another.

In the case of each of the modes of operation described above, the frame of the apparatus preferably has adjustable panel members (not shown) which co-operate with the slots 160 to guide the panel into its correct position in the apparatus. The anvils are preferably adjustable to accommodate different panel thicknesses.

It will, therefore, be appreciated that the aforementioned and other desirable objects have been achieved; however, it should be emphasized that the particular embodiments of the invention, which are shown and described herein, are intended as merely illustrative and not as restrictive of the invention.

The invention is claimed in accordance with the following:

1. Apparatus for securing electrical connectors to a panel, the connectors being in the form of a strip of connectors, each connector having a pair of legs extending from one end of the connector and one or more legs extending from the other end of the connector, the apparatus comprising connector strip processing means for acting on the strip so that two of the legs of a connector of the strip extend essentially at right-angles to the strip, means for advancing the strip of connectors from the processing means towards a shearing means at which the connector is sheared from the strip, an anvil spaced from the shearing means, a tool arranged to drive the connector, when sheared from the strip, from the shearing means towards the anvil, and surfaces for guiding the connector when driven by the tool, so that the two legs are driven through opening means of said panel disposed between the shearing station and the anvil so that the two legs are deformed by the anvil to secure the connector to the panel.

2. Apparatus according to claim 1, in which the shearing means and the tool are comprised in a tool head which is movable towards the anvil by a motor to trap the panel between the tool head and the anvil, the motor serving to drive the tool head towards the anvil until the head engages the panel and then to move the tool relative to the tool head to drive the connector towards the panel.

3. Apparatus according to claim 2, in which the tool is connected to a toggle linkage driven by the motor and has a cam surface which drives a cam follower fixed relative to the tool head to move the tool head towards the anvil, the cam surface ceasing to drive the cam follower when the tool head engages the panel and sliding on the cam to permit the toggle linkage to straighten so that the tool is driven towards the anvil.

4. Apparatus according to claim 3, in which the tool is mounted on a plunger which is slidable in a cylinder in the tool head and is connected to a link of the toggle linkage by a pin which is movable along slots in the cylinder wall.

5. Apparatus according to claim 2, in which the tool head is carried by one end of a lever, the other end of which is pivoted to a frame of the apparatus, a spring urging the lever to rotate in a sense such that the tool head is urged away from the anvil.

6. Apparatus according to claim 3 in which the toggle linkage comprises a first link pivoted at one end to the tool head, a second link pivoted at one end to the frame, the other end of each link being pivoted about a common pin to which the piston rod of the motor is also pivoted, the straightening movement of the links being limited by a stop.

7. Apparatus according to claim 3 in which the tool has a shearing edge which cooperates with a further shearing edge within the tool head to shear the connector from the strip, the further shearing edge being disposed in an axial channel in the tool head, along which the tool is movable towards the anvil.

8. Apparatus according to claim 7, in which the axial channel communicates with a further channel extending at right angles thereto and along which the connector is driven towards the axial channel by the connector strip advancing means.

9. Apparatus according to claim 2, in which the connector strip processing means comprises a connector bending tool connected to the tool head.

10. Apparatus according to claim 9, in which the connector bending tool is associated with a connector strip shearing tool which shears one leg of the connector from a carrier strip to which that leg is connected, prior to the connector bending operation.

11. Apparatus according to claim 9, in which the connector bending tool is arranged to bend the connector about one of its legs which is connected to a carrier strip so that the connector extends essentially at right angles to the carrier strips.

12. Apparatus according to claim 9, in which the connector bending tool is arranged to bend one leg at each end of the connector to extend at right angles to a carrier strip to which the remaining legs of the connector are attached.

13. Apparatus according to claim 9, in which a shear plate is disposed on the opposite side of the head to the bending tool and is driven by the toggle linkage to chop the carrier strip from which the connector has been severed.

14. Apparatus according to claim 2, in which the connector driving tool is detachably mounted on a plunger slidable in a cylinder in the tool head, a channel down which the connector is driven by the tool towards the anvil, and the shearing means being comprised in an assembly which is detachable from the tool head, a connector bending tool at the connector strip processing means which is detachably mounted on a member which is slidable relative to the cylinder, a feed track assembly along which the strip of connectors is fed to the shearing means which is also detachably mounted on the tool head.

15. Apparatus according to claim 14, in which the feed track assembly comprises a central channel for receiving the connector when bent by the bending tool.

16. Apparatus according to claim 14, in which the feed track assembly comprises a central trapezoidal section rod about which two legs of the connector are bent by the bending tool.

17. Apparatus according to claim 1, in which the anvil comprises a horn arranged to extend through a hole in the panel, and a forming surface at the root of the horn for bending a leg of the connector when inserted through the hole, against the panel to secure the connector to the panel.

18. Apparatus according to claim 1, in which the anvil comprises two horns each arranged to extend through a hole in the panel, a concave forming surface at the root of each horn and a flat surface for engaging the panel and being disposed between the forming surfaces, each of the two legs when inserted through one of the holes being bent by the forming surfaces against the panel to secure the connector thereto.

References Cited

UNITED STATES PATENTS

| | | | |
|---|---|---|---|
| 2,726,394 | 12/1955 | Lowell | 29—203 |
| 2,748,388 | 6/1956 | Cardani | 227—88 |
| 3,184,950 | 5/1965 | Sitz | 72—338 X |
| 3,200,481 | 8/1965 | Lenders | 29—203 |

THOMAS H. EAGER, Primary Examiner

U.S. Cl. X.R.

72—338; 227—88